United States Patent

Kobayashi et al.

[11] Patent Number: 5,990,855
[45] Date of Patent: Nov. 23, 1999

[54] IMAGE INFORMATION PROCESS APPARATUS FOR CAUSING A DISPLAY TO DISPLAY CONTINUOUS TONES IN A PSEUDO MANNER

[75] Inventors: Mitsugu Kobayashi, Nagoya; Hisao Uehara, Ogaki; Makoto Kitagawa, Anpachi-gun, all of Japan

[73] Assignee: Sanyo Electric Co., Ltd., Osaka, Japan

[21] Appl. No.: 08/813,465

[22] Filed: Mar. 10, 1997

[30] Foreign Application Priority Data

Mar. 11, 1996 [JP] Japan ................................ 8-053026
Mar. 29, 1996 [JP] Japan ................................ 8-076812
Jul. 18, 1996 [JP] Japan ................................ 8-189624

[51] Int. Cl.$^6$ ................................................ G09G 3/36
[52] U.S. Cl. ........................................ 345/88; 345/89
[58] Field of Search .............................. 345/87, 88, 89, 345/147, 149

[56] References Cited

U.S. PATENT DOCUMENTS

| | | | |
|---|---|---|---|
| 4,897,734 | 1/1990 | Sato et al. ............................ | 358/448 |
| 4,908,614 | 3/1990 | Yamagishi ........................... | 340/723 |
| 5,596,349 | 1/1997 | Kobayashi et al. ................. | 345/147 |
| 5,638,188 | 6/1997 | Moro et al. .......................... | 358/456 |
| 5,673,120 | 9/1997 | Fujii ...................................... | 358/456 |

*Primary Examiner*—Richard A. Hjerpe
*Assistant Examiner*—Ronald Laneau
*Attorney, Agent, or Firm*—Loeb & Loeb, LLP

[57] ABSTRACT

There is provided an image information process apparatus to be applied to a display for displaying bit image display data for each pixel, for enabling the display to display continuous tones in an error diffusion manner based on P bit image data, P being larger than L. This apparatus includes a plurality of adding circuits to which a plurality of P bit image data are concurrently supplied. A predetermined lower bit of an added result at respective adding circuits is used as error data supplied to the next adjacent adding circuit. An error data holding circuit holds a predetermined lower bit of an output from an adding circuit corresponding to the last column pixel in image data supplied. It then supplies the lower bit held to an adding circuit corresponding to the top front column pixel of the image data supplied. With this arrangement, a display which is capable of displaying images based on digital data of a limited number of bits displays in a pseudo manner continuous tones expressed using a higher number of bits than the limited number. In addition, performance and processing speed of image information processing are improved.

8 Claims, 12 Drawing Sheets

```
                                              ERROR DATA "8"
PRESET
 DATA   1 2 3 4 5 6 7 8 9 10 11 12 13 14 15 16    1 2 3 4 5 6 7 8 9 10 11 12 13 14 15 16
  14   1 *  .  .  .  .  .  .  .  .  .  .  .  .  .  .  .     1 · # · # · # · # · # · # · # · #
  11   2  .  .  .  *  .  .  .  .  .  .  .  .  .  .  .  .    2 # · # · # · # · # · # · # · # ·
   8   3  .  .  .  .  .  .  .  *  .  .  .  .  .  .  .  .    3 · # · # · #   # · # · # · # · #
   5   4  .  .  .  .  .  .  .  .  .  .  *  .  .  .  .  .    4 # · # · # · # · #   # · # · # ·
   2   5  .  .  .  .  .  .  .  .  .  .  .  .  .  *  .  .    5 · # · # · # · # · # · #   # · #
  15   6  .  .  .  .  .  .  .  .  .  .  .  .  .  .  .  *    6 # · # · # · # · # · # · # · # ·
  12   7  .  *  .  .  .  .  .  .  .  .  .  .  .  .  .  .    7 · #   # · # · # · # · # · # · #
   9   8  .  .  .  .  *  .  .  .  .  .  .  .  .  .  .  .    8 # · # · #   # · # · # · # · # ·
   6   9  .  .  .  .  .  .  .  .  *  .  .  .  .  .  .  .    9 · # · # · # · #   # · # · # · #
   3  10  .  .  .  .  .  .  .  .  .  .  .  *  .  .  .  .   10 # · # · # · # · # · #   # · # ·
   0  11  .  .  .  .  .  .  .  .  .  .  .  .  .  .  *  .   11 · # · # · # · # · # · # · # · #
  13  12  *  .  .  .  .  .  .  .  .  .  .  .  .  .  .  .   12 #   # · # · # · # · # · # · # ·
  10  13  .  .  .  *  .  .  .  .  .  .  .  .  .  .  .  .   13 · # · # · # · # · # · # · # · #
   7  14  .  .  .  .  .  .  *  .  .  .  .  .  .  .  .  .   14 # · # · # · # · # · # · # · # ·
   4  15  .  .  .  .  .  .  .  .  .  .  *  .  .  .  .  .   15 · # · # · # · # · # · # · # · #
   1  16  .  .  .  .  .  .  .  .  .  .  .  .  .  *  .  .   16 # · # · # · # · # · # · # · # ·
```

| ODD COLUMN | EVEN COLUMN | Row | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| 13 | 14 | 1 | * | . | . | . | . | . | . | . | . | . | . | . | . | . | . | . |
| 10 | 11 | 2 | . | . | . | * | . | . | . | . | . | . | . | . | . | . | . | . |
| 7 | 8 | 3 | . | . | . | . | . | . | * | . | . | . | . | . | . | . | . | . |
| 4 | 5 | 4 | . | . | . | . | . | . | . | . | . | * | . | . | . | . | . | . |
| 1 | 2 | 5 | . | . | . | . | . | . | . | . | . | . | . | . | * | . | . | . |
| 14 | 15 | 6 | . | . | . | . | . | . | . | . | . | . | . | . | . | . | . | * |
| 11 | 12 | 7 | . | . | * | . | . | . | . | . | . | . | . | . | . | . | . | . |
| 8 | 9 | 8 | . | . | . | . | . | * | . | . | . | . | . | . | . | . | . | . |
| 5 | 6 | 9 | . | . | . | . | . | . | . | . | * | . | . | . | . | . | . | . |
| 2 | 3 | 10 | . | . | . | . | . | . | . | . | . | . | . | * | . | . | . | . |
| 15 | 0 | 11 | . | . | . | . | . | . | . | . | . | . | . | . | . | . | * | . |
| 12 | 13 | 12 | . | * | . | . | . | . | . | . | . | . | . | . | . | . | . | . |
| 9 | 10 | 13 | . | . | . | . | * | . | . | . | . | . | . | . | . | . | . | . |
| 6 | 7 | 14 | . | . | . | . | . | . | . | * | . | . | . | . | . | . | . | . |
| 3 | 4 | 15 | . | . | . | . | . | . | . | . | . | . | * | . | . | . | . | . |
| 0 | 1 | 16 | . | . | . | . | . | . | . | . | . | . | . | . | . | * | . | . |

Fig. 12

IMAGE INFORMATION PROCESS APPARATUS FOR CAUSING A DISPLAY TO DISPLAY CONTINUOUS TONES IN A PSEUDO MANNER

BACKGROUND OF THE INVENTION

1. Field of the Invention

The present invention relates to a pseudo continuous tone process apparatus for causing a display to display continuous tones in an error diffusion manner, wherein the display displays images based on predetermined bits of image display data, and the continuous tones are displayed using a higher number of bits than the predetermined number of bits in a pseud manner. In particular, this pseudo continuous tone process apparatus utilizes finer continuous tones than the continuous tones displayable by an LCD display having a digital driver for input of a predetermined number of bits, so that the display can display images which are closer to original images.

2. Description of the Prior Art

Recently, a high precision color liquid crystal display for a multimedia use has been developed for office automation. Such color liquid crystals each include a three or four bit digital driver with respect to each of R, G, and B colors. For instance, a color liquid crystal having a three bit digital driver can display eight levels of tones for each color, i.e., 512 colors in total. Such a display is sufficiently usable when it is used simply as a monitor for office automation. However, it is insufficient for displaying motion or still images for a multimedia use, and an increase of the number of continuous tones displayable has thus been desired.

In order to solve this problem, the following methods have conventionally been employed to increase the number of continuous tones displayable in a pseudo manner: a method wherein an undisplayable component with one pixel is diffused into its surrounding adjacent pixels in the same screen frame (inner-frame error diffusion), and a method wherein such a component is diffused into identical pixels over a plurality of screen frames (inter-frame error diffusion). In this application, "error data" signifies data for the lower bit(s) of image data, the lower bit data being unable to be displayed via the digital driver of the display in use.

FIG. 1 is a block diagram showing a multi-continuous tone process circuit using inner-frame error diffusion, for one color among R, G, and B.

In this diagram, a latch circuit 1 sequentially receives eight bit original image data SD in synchronism with a dot clock DCLK and latches them. It then supplies the data SD into an adding circuit 2. The adding circuit 2 in turn adds the lower data SD and four bit error data EI to thereby make eight bit corrected image data HD. An error data hold circuit 3 receives the lower four bits of the corrected image data HD as error data EI according to a dot clock DCLK and holds them for subsequent use in inner-frame error diffusion. A circuit 3 outputs the error data EI to the adding circuit 2 when the original data SD for the next pixel is latched in latch circuit 1. The upper four bits of the corrected image data HD are held in an output latch circuit 4 as a result of inner-frame error diffusion and then outputted to a display as image display data DG. As outlined above, the adding circuit 2 and the error data hold circuit 3 together constitute an inner-frame error diffusion circuit. In this circuit, original image data SD is added to error data EI of a prior pixel by one dot in the adding circuit 2, so that the error data of the lower four bits of the previous pixel is sequentially diffused into its adjacent subsequent pixels. As the result of such sequential diffusion of errors, the fineness of continuous tones displayable is increased in a pseudo manner.

As described above, when four bit image display data DG for respective R, G, and B colors are supplied after being subjected to error diffusion processing into a liquid crystal display which incorporates a digital driver for four bit input, it is possible to display continuous 256×256×256 tones in a pseudo manner.

The above is an outline of a multi-continuous tone image process apparatus which utilizes inner-frame error diffusion. For more details, Japanese Patent Application No. Hei 4-307210 filed by the present applicant is available for reference.

In the aforementioned pseudo continuous tone process apparatus, error diffusion is made through adding processing in the horizontal direction. Thus, an image may influence the image on its right, resultantly affecting the entire image display data on the display panel. For displaying a moving image or an image expressed in varying densities, this pseudo continuous tone processing is advantageous, significantly improving the image quality. However, for displaying an image expressed in rather flat densities, such as the sky or a human face, image data for a discontinuous image will bring about an error which is made based on that image data, and this will eventually cause a visible trace in a displayed image on the right side of the discontinuous image, ruining the whole display quality.

Assume a case where a mouse cursor is moved on a computer screen with a flat background. The cursor seems to move as if is leaving a tail, because errors in the image data for the cursor moving in a flat density background appear far to the right from the cursor itself, changing the images there.

Further, in a flat density image, a carry-over due to error data added occurs periodically. Because of this, the position of a bright pixel and a dark pixel are coincident in each adjacent horizontal scanning line and also in respective frames. This results in the appearance of a vertical line on a display screen, deteriorating the display quality.

In order to solve this problem, image data for the present pixel is compared to that for the immediately preceding pixel.

If the difference is more than a predetermined value, it is judged that the edges of these images, namely, the previous image and the present image, do not have relevance with each other. Thus, error data which have been accumulated so far are all reset so that the previous image will not influence the present image as they are essentially different from each other.

In addition, in a flat density image, error data is reset for every certain number of pixels, the certain number being indicated by the number of bits of error data. In this event, the position of a pixel where error data is reset, that is, a reset timing is set different for every horizontal scanning line. With these arrangements, carry-over due to added error data occur in scattered places over the screen, which can prevent production of a specific pattern and residual influence of error data, resultantly improving display quality for a flat image.

A pseudo continuous tone process apparatus having the above function is disclosed in Japanese Patent Application No. Hei 6-310817 filed by the present applicant.

FIG. 2 is a block diagram showing the structure of the above -pseudo continuous tone process apparatus.

Latch circuit 11 sequentially receives eight bit original image data GD in synchronism with a dot clock DCLK and latches them. Receiving image data UGD from latch circuit 11, an operation circuit 12, which is an eight bit adding circuit, adds them and four bit error data ED from the error control circuit 13. The upper four bits of an eight bit image data outputted from operation circuit 12 are supplied to latch circuit 14 according to a dot clock DCLK and held therein before being outputted as image display data HD into a digital driver for four bit input of an LCD display. The lower four bits, on the other hand, are supplied to latch circuit 15 as error data EN to be added to image data for the next pixel. The error data EN held in circuit 15 is supplied to error control circuit 13. Image judgement circuit 16 compares respective image data GD sequentially supplied, to thereby detect an image edge, an image pattern, or the like. A detected result is supplied via a signal SEL to error control circuit 13.

Error control circuit 13 is responsible for the following operations; receiving error data EN from latch circuits 15 and outputting it to operation circuit 12 so that the operation circuit 12 carries out general error diffusion processing; resetting error data EN at a different pixel position for every horizontal scanning line; and preparing error data to be added using the error data of the lower four bits of image data GD, based on the assumption that the image data GD are maintained as the image data before an image boundary and outputting the error data prepared to the operation circuit 12.

FIG. 3 is a block diagram showing the structure of an error control circuit 13. Horizontal counter 27, a four bit counter reset by a vertical synchronous signal VSYNC, is used for detecting the present horizontal scanning line position so as to change a reset pixel position for every horizontal scanning line. To detect the present horizontal scanning line position, the counter 27 counts horizontal synchronous signals HSYNC. According to the counter value of horizontal counter 27, decoder 28 outputs data of a predetermined value. That is, it outputs data of sixteen different values for changing a reset pixel position depending on the position of a horizontal scanning line in question. The dot counter 29 is preset to a valve output from decoder 28 using horizontal synchronous signal HSYNC. Dot counter 29 is a four bit counter for incrementing a preset value according to a clock signal CLK which is synchronous to image data GD. This dot counter 29 issues a reset signal RES when all the bits of its output become "1," that is, the counter value becomes "15." Upon issuance of a reset signal RES, reset circuit 20 cuts off the error data EN of the immediately preceding pixel and instead outputs data "0" to the selection circuit 21. With data "0" supplied as errors data EN, diffusion of error data which have been accumulated thus far is reset.

Error generation circuit 22 prepares error data ED to be added to the present image data GD, based on the counter value of dot counter 29 and error data GDE of the present image data GD to be processed. To be specific, it multiplies the dot counter 29 value plus one by the error data GDE. Thus, the obtained error data ED is the one which has been computed based on the assumption that the present image data GD was continuous to the previous image data, even if in actual fact it was not. The error data ED prepared is supplied to selection circuit 21. Selection circuit 21, switched under control of a signal SEL from image judgement circuit 16, generally selects error data EN which has passed through latch circuit 15 and reset circuit 20, and outputs it to the operation circuit 12. However, if an image boundary is detected and a signal SEL is accordingly outputted, selection circuit 21 instead outputs error data ED which was prepared by error generation circuit 22 to the operation circuit 12.

In the following, resetting of error data EN and error generation in FIG. 3 will be described with reference to FIGS. 4A and 4B. FIG. 4A shows a reset pattern, in which the horizontal numbers are the numbers of pixel positions, and the vertical numbers are line numbers and preset data values. Error data EN are reset at pixels with * in this diagram. Obviously, repetition patterns are formed over a 16×16 pixel area as horizontal counter 26 and dot counter 29 are both of four bits. Error resetting is held for every sixteen pixels such that reset positions are displaced by three pixels between adjacent horizontal scanning lines. FIG. 4B shows by # positions where carry-over occurs (i.e., operation circuit 12 gives a carry-over to the upper four bits;) with error data EN "8" when the reset pattern shown in FIG. 4A is applied.

For instance, when horizontal counter 27 shows a counter value "1" according to a horizontal synchronous signal HSYNC, decoder 28 outputs data "14," which is then preset into dot counter 29. If one clock signal CLK is applied in the above condition, dot counter 29 turns its counter value into "15", issuing a reset signal RES. In short, error data is reset at a pixel position "1." Thereafter, dot counter 29 increments its counter value for every input of a clock signal CLK as "0, 1, 2 . . . ". In other words, the dot counter 29 value shows a distance expressed in pixels from a reset position to the present pixel. For example, if the dot counter 29 value is "5", for the pixel "7", it is assumed that the image data GD for the pixel "7" is maintained as that of the previous pixel before the image boundary, error data to be added to this image data GD becomes a six-fold value of the error data GDE of this image data GD. Therefore, error generation circuit 22 calculates error data ED to be added by multiplying a dot counter 29 value plus one by error data GDE. In cases where there is an image boundary between pixel positions "6" and "7", the image data GD for the pixel "7" is added to error data ED which was computed based on the assumption that the image data GD was maintained as that of the previous pixel. As a result, the carry-over pattern shown in the pixel "7" column in FIG. 4B is obtained, improving the display quality of an image near the boundary.

Although a single reset pattern is used in the above, a plurality of reset patterns according to error data GDE of image data GD may be prepared in actual fact. In such cases, the same number of decoders 28 and dot counters 29 as the number of reset patterns are provided so that an output of an appropriate dot counter 29 is selected depending on the value of error data DGE. For the details, refer to Japanese Patent Application No. Hei 6-310817.

When a conventional pseudo continuous tone process apparatus having the structures shown in FIGS. 1 and 2 is applied to a general VGA (Video Graphics Array) liquid crystal display having 640×480 pixels, the frequency of a dot clock DCLK which is synchronous to image data GD is set at about 25 MHz. By the way, as the result of recent developments in liquid crystal displays, a high precision liquid crystal display having 1024×768 pixels, called XGA (extended graphics array), or even 1280×1024 pixels has come to be in use. If the above pseudo continuous tone process apparatus is employed for such a high precision liquid crystal display, a dot clock has to have such a high frequency as 70–90 MHz, and the structures shown in FIGS. 1 and 2 may have a risk of becoming inoperative as an integrated circuit.

Next described is another conventional method for increasing the number of continuous tones displayable in a pseudo manner. In this method, an undisplayable component with one pixel is diffused into the identical pixel in the next frame (inter-frame error diffusion). To be specific, the lower bit(s) of image data in one frame which were not displayed in that frame are held as error data in a frame memory and added to the image data for the identical pixel in the next frame. Error data is thus diffused into other frames, so that pseudo continuous tones are obtained.

In this method, the image data for identical pixels in respective frames are the same in cases of a still image display. In cases of a moving image display as well, they are almost the same between adjacent frames since moving images between adjacent frames can be considered as still images. This fact is utilized in this method. That is, when the above inter-frame error diffusion process is carried out with one bit error data, a carry-over occurs for every other frame in cases of error data "1". Assuming a case where four bit image data is transformed into three bit display data, the transformation is made as follows

TABLE 1

|  | image data | added result inter-frame error data | display data | processing |
| --- | --- | --- | --- | --- |
| frame 1 | 0101 | 0101 | 010 | non-adding |
| frame 2 | 0101 | 0110 | 011 | adding |
| frame 3 | 0101 | 0101 | 010 | non-adding |
| frame 4 | 0101 | 0110 | 011 | adding |
| frame 5 | 0101 | 0101 | 010 | non-adding |
| . | . | . | . | . |
| . | . | . | . | . |
| . | . | . | . | . |

In this case, the lowest bit of image data keeps being added to its immediately upper bit, without holding error data, during an entire period corresponding to one frame for every other frame. With this arrangement, a frame memory is omissible.

FIG. 5 is a block diagram showing an image information process apparatus for transforming seven bit image data SD into six bit display data DG and outputting the latter. The upper six bits SD1–6 of the seven bits constituting image data are supplied to adding circuit 31 via one of the adding inputs thereof, and the lowest bit SD0 is inputted to AND gate 32 via one of the inputs thereof. AND gate 32 also receives a timing control signal ST via the other input, and supplies an output to adding circuit 31 via the other adding input. Adding circuit 31 outputs display data DG0–5 in-to a display.

The lowest bit SD0 is not added when a timing signal ST has a value "0," and it is added to its immediately upper bit when a timing signal ST has value "1." If adding is performed with respect to all the pixels in one frame for every other frame, alternation of bright and dark frames will be caused, resulting in flickering. In order to solve this problem and achieve consistent image display, adding is performed for every other pixel in the horizontal direction as well as for every other line in one frame. Further, this alternate pattern of adding and non-adding is reversed for every frame. A timing signal ST is generated by a timing signal generation circuit 33 based on the signals which the circuit 33 receives, namely, a vertical synchronous signal VSYNC, a horizontal synchronous signal HSYNC, and a dot clock DCLK synchronous to image data SD.

In the example shown in FIG. 5, image data SD is of seven bits and display data is of six bits. However, there may be liquid crystal displays which incorporate digital drivers of 3, 4, 5 or 6 bits, etc. In order to be applied to any of these displays, an image information process apparatus must include a plurality of circuits capable of handling the respective cases.

In FIG. 6, there are shown an adding circuit 34 for converting four bit image data into three bit display data, an adding circuit 35 for converting five bit image data into four bit display data, an adding circuit 36 for converting six bit image data into five bit display data, and an adding circuit 37 for converting seven bit image data into six bit display data. Outputs of these adding circuits 34, 35, 36, and 37 are selected by a selection circuit and outputted.

In operation, adding circuit 34 receives image data SD4–6 via a first group of adding inputs, namely adding inputs A0–2 and an output of AND gate 39 via one of the adding inputs constituting a second group, namely adding input B0. AND gate 39 receives image data SD3. Adding circuit 34 also receives data "0" via (the rest of the second group, namely adding inputs B1–2. Adding circuit 35 receives image data SD3–6 via a first group of adding inputs, namely adding inputs A0–3 and an output of AND gate 40 via one of the adding inputs constituting a second group, namely adding input B0. AND gate 40 receives image data SD2. Adding circuit 35 also receives data "0" via the rest of the second group, namely adding inputs B1–3. Adding circuit 36 receives image data SD2–6 via a first group of adding inputs, namely adding inputs A0–4 and an output of AND gate 41 via one of the adding inputs constituting a second group, namely adding input B0. AND gate 41 receives image data SD1. Adding circuit 36 also receives data "0" via the rest of the second group, namely via adding inputs B1–4. Adding circuit 37 receives image data SD1–6 via a first group of adding inputs, namely adding inputs A0–5 and an output of AND gate 42 via one of the adding inputs constituting a second group, namely adding input B0. AND gate 42 receives image data SD0. Adding circuit 37 also receives data "0" via the rest of the second group, namely adding inputs B1–5. AND gates 39, 40, 41, and 42 also receive a timing control signal ST via other inputs.

As described above, a plurality of adding circuits are provided so as to cope with a liquid crystal display of a different number of input bits. Those adding circuits supply their outputs to switch circuit 38, which in turn selects one of the supplied outputs according to a selection signal SEL0 or SEL1.

In the image information process apparatus shown in FIG. 6, however, even when the apparatus is working to convert seven bit image input into six bit display data, for instance, adding circuits which are not relevant to this conversion, namely adding circuits 4, 5, and 6, are also kept in an operative state. This will increase power consumption. What is worse, if the above apparatus is formed into an integrated circuit, a significant number of elements are used, increasing chip areas and thus related costs.

SUMMARY OF THE INVENTION

The present invention has been conceived to overcome the above problems and has the following characteristic features.

In one aspect of the present invention, there is provided an image information processing apparatus applied to a display for displaying images based on L bit image display data for each pixel, for enabling the display to display continuous tones in a pseudo manner based on P bit image data for the tones, P being larger than L, comprising a plurality of adding circuits corresponding to a plurality of P bit image data for horizontally consecutive pixels, for concurrently receiving the plurality of P bit image data; an error data supply circuit for supplying a predetermined lower bit of an added result at each of the plurality of adding circuits as error data to a next adjacent adding circuit; and an error data holding circuit for holding a predetermined lower bit of an output of an adding circuit corresponding to a last column pixel in image data supplied, and for supplying the predetermined lower bit held into an adding circuit corresponding to a top front column pixel in the image data supplied.

With this arrangement, image data for a plurality of pixels are concurrently processed.

In another aspect of the present invention, the plurality of adding circuits each include a first adding circuit and a second adding circuit for concurrently receiving pixel data for a front column pixel and a rear column pixel of the horizontally consecutive pixels, respectively; the error data supply circuit supplies a predetermined lower bit of an output of the first adding circuit as error data to the second adding circuit; and the error data holding circuit holds a predetermined lower bit of an output of the second adding circuit, and supplies the predetermined lower bit held to the first adding circuit.

With this arrangement, image data for two horizontally continuous pixels are concurrently processed.

In still another aspect of the present invention, there is provided an image information processing apparatus applied to a display for displaying images based on L bit image display data for each pixel, for enabling the display to display consecutive tones in a pseudo manner based on P bit image data for the tones, P being larger than L, comprising an error data preparation circuit for making error data for the front column pixel by adding a predetermined lower bit of the image data for a front column pixel in image data for horizontally consecutive front and rear column pixels to error data which is not displayed with an immediately preceding column pixel, the image data for horizontally consecutive front and rear column pixels being concurrently supplied, and for making error data to be added to the image data for a pixel in a next column of the rear column by adding the error data for the front column pixel to a predetermined lower bit of the image data for the rear column pixel; and an adding circuit for adding the error data for the front column pixel to the image data for the rear column pixel, and outputting an added result as image display data for the rear column pixel, the error data preparation circuit and the adding circuit performing respective adding operations at their own timings.

With this arrangement, the processing speed of an adding operation is effectively increased.

In still another aspect of the present invention, there is provided an image information processing apparatus applied to a display for displaying images based on L bit image display data for each pixel, for causing the display to display continuous tones in an error diffusion manner based on P bit image data, P being larger than L, comprising a first adding circuit for adding error data and a predetermined lower bit of the image data for a front column pixel in image data for horizontally consecutive front and rear column pixels; a second adding circuit for adding a carry-over signal from the first adding circuit and a predetermined upper bit of the image data for the front column pixel, and outputting an added result as the image display data for the front column pixel; a third adding circuit for adding error data outputted from the first adding circuit and a predetermined lower bit of image data for the rear column pixel in the image data for horizontally consecutive front and rear column pixels, the image data for the rear column pixel being concurrently supplied with the image data for the front column pixel; a first holding circuit for holding an output of the third adding circuit for a predetermined period of time, and outputting error data to the first adding circuit; a second holding circuit for holding the error data outputted from the first adding circuit for a predetermined period of time; and a fourth adding circuit for adding the error data held in the second holding circuit and the image data for the rear column pixel, and outputting a predetermined upper bit of an added result as image display data for the rear column pixel.

With this arrangement, error data for two pixels are prepared at an earlier stage, and image data for a rear column pixel and error data for the front column pixel are added at a later stage. As a result, the processing speed of an adding operation is increased.

In still another aspect of the present invention, an image information process circuit further comprises a carry-over signal generation circuit for generating a carry-over signal having the same content as a carry-over signal outputted from the second adding circuit based on a logical AND of the carry-over signal outputted from the first adding circuit and a predetermined upper bit of the image data for the front column pixel, and outputting the carry-over signal generated prior to issuance the carry-over signal from the second adding circuit.

With this arrangement, a carry-over signal due to error data added is generated earlier, thereby increasing processing speed.

In still another aspect of the present invention, an image information process apparatus further comprises a second carry-over signal generation circuit for generating a carry-over signal which is to be generated when the error data for the front column pixel is added to the image data for the rear column pixel, based on a logical AND of a carry-over signal from the third adding circuit and a predetermined upper bit of the image data for the rear column pixel.

With this arrangement, a carry-over signal is generated earlier through adding of error data for a front column pixel and image data for a rear column pixel, thereby increasing processing speed.

When the above structure is applied, the performance of error diffusion processing is improved. This makes it possible to process image data which was supplied in synchronism with a high speed dot clock, according to the speed it is supplied at. As a result, the present apparatus can be applied to a display having a large number of pixels, in particular, a high precision display called XGA. This resultantly allows a personal computer employing an XGA display to display an increased number of continuous tones in a pseudo manner, helping to give the display a higher commodity value.

In still another aspect of the present invention, there is provided an image information processing apparatus applied to a display for displaying images based on L bit image display data for each pixel, for causing the display to display continuous tones in a pseudo manner based on P bit image data of a P number of bits, P being larger than L, comprising a plurality of image data process circuits corresponding to a plurality of image data for horizontally consecutive front and rear column pixels, for concurrently receiving the plurality of image data; wherein each of the plurality of image data process circuits includes an error data output circuit for outputting a lower "P-L" bit/bits which is/are not displayed by the display as error data; an operation circuit for adding the image data supplied and the error data outputted from one of the plurality of image data process circuits corresponding to a pixel at an immediately preceding column; and an error control circuit for periodically resetting the error data, making error data to be added to image data after a change of pixel data, based on error data of image data after the change of pixel data and an assumption that the image data after the change is maintained as image data before the change, and supplying the error data made to the operation circuit in place of error data outputted from the image data process circuit corresponding to a pixel at an immediately preceding column.

The above arrangement makes it possible to improve display quality around an image boundary, and to increase a processing speed through parallel processing for a plurality of continuous pixels.

In still another aspect of the present invention, the plurality of image data process circuits each include an odd column image data process circuit and an even column image data process circuit for concurrently receiving image data for horizontally continuous odd and even column pixels, respectively.

With this arrangement, image data for continuous odd and even columns can be processed in parallel.

In still another aspect of the present invention, the error control circuit includes a horizontal counter for counting horizontal synchronous signals for periodically changing a reset pixel position where the error data is reset for every horizontal scanning line; an odd column reset position setting circuit and an even column reset position setting circuit for respectively specifying the reset pixel positions in corresponding horizontal scanning lines, based on a counter value of the horizontal counter; an odd column pixel counter for detecting a pixel position in an odd column according to a pixel reset position specified by the odd column reset position setting circuit; and an even column pixel counter for detecting a pixel position in an even column according to a pixel reset position specified by the odd column reset position setting circuit.

With this arrangement, a processing pixel position and a pixel position where error data should be reset can be determined separately for continuous odd and even columns. In other words, a pixel position can be known for every image data process circuit.

In still another aspect of the present invention, the odd column pixel counter and the even column pixel counter are preset with values indicating pixel preset positions specified by the odd column reset position setting circuit and the even column reset position setting circuit, respectively, such that a least significant bit of the values preset is fixed, and numbers are added to values of all bits except for the least significant bit of the values preset indicating pixel preset positions, according to a clock signal.

With this arrangement, respective pixel counters can count by two pixels, so that a processing pixel position and a reset pixel position can be determined for every image data process circuit.

When the above structure is applied, a pixel position and a reset position can be correctly located in the processing of respective image data. This allows generation of a correct reset pattern even when a plurality of image data are concurrently processed so that a correct reset pattern is used for periodic resetting of error data. Further, since a distance from a reset position to the processing pixel position is known in the processing of respective image data, it is possible to make error data based on the assumption that images are maintained between before and after an image boundary, irrespective of the location of the boundary when a plurality of image data are concurrently processed. As a result, there can be provided a high speed pseudo continuous tone process apparatus which is applicable to a display having a large number of pixels, such as the one called XGA.

In still another aspect of the present invention, there is provided an image information process apparatus which selects alternately for every frame to add or not add a least significant bit of N+1 bit image data to an upper N bits of the N+1 bit image data so as to display in a pseudo manner a finer continuous tones than those which are able to be displayed with respective pixels, and outputs N bit image display data, comprising an adding circuit for receiving the N+1 bit image data via one group of adding inputs thereof; and a plurality of gate circuits each for receiving data for the least significant bit of the N+1 bit image data and supplying an output to the adding circuit via another group of adding inputs; wherein each of the plurality of gate circuits receives a timing signal for controlling a timing to add or not add a least significant bit of N+1 bit image data to upper N bits of the N+1 bit image data, as well as a selection signal for selecting one of the plurality of gate circuits according to a value of N which is desirably set.

With this arrangement, by simply changing settings, it is possible to use an image information process apparatus with one adding circuit activated for various displays of different input bit numbers.

In still another aspect of the present invention, the adding circuit in the above structure receives the N+1 bit image data via adding inputs for from a most significant bit input to a least significant bit input which all belong to one group of adding inputs, a value of N+1 varying depending on the value of N which is desirably set, the least significant bit being determined depending on a minimum bit number which N+1 is allowed to take, and the adding circuit outputs N bit data out of an added result as image display data, the N bit data consisting of N bits beginning with a most significant bit.

In still another aspect of the present invention, the adding circuit in the above structure includes such number of adding inputs that correspond to a maximum bit number which a value of N+1 takes, the value of N+1 being determined upon a value of N which is desirably set.

With this arrangement, it is possible to use the present image information process apparatus for a display of a desired N bit input after hanging the number of bits of an output of the apparatus depending on a display to be used.

When the above structure is applied, various liquid crystal displays each incorporating a digital driver of a different number of input bits can be handled by a single adding circuit, instead of providing a plurality of them. Accordingly, the number of gates can be reduced, as well as a chip area. This will help to reduce power consumption.

BRIEF DESCRIPTION OF THE DRAWINGS

The above and the other objects, features, and advantages, will become further apparent from the following description of the preferred embodiment taken in conjunction with the accompanying drawings wherein:

FIG. 4A shows a reset pattern of error data generated in the structures shown in FIGS. 2 and 3;

FIG. 4B shows a carry-over pattern of upper bits generated in the structures shown in FIGS. 2 and 3;

FIG. 12 shows a reset pattern of error data in the apparatus of a third embodiment of the present invention;

DESCRIPTION OF THE PREFERRED EMBODIMENTS

Embodiment 1

Figure 7:
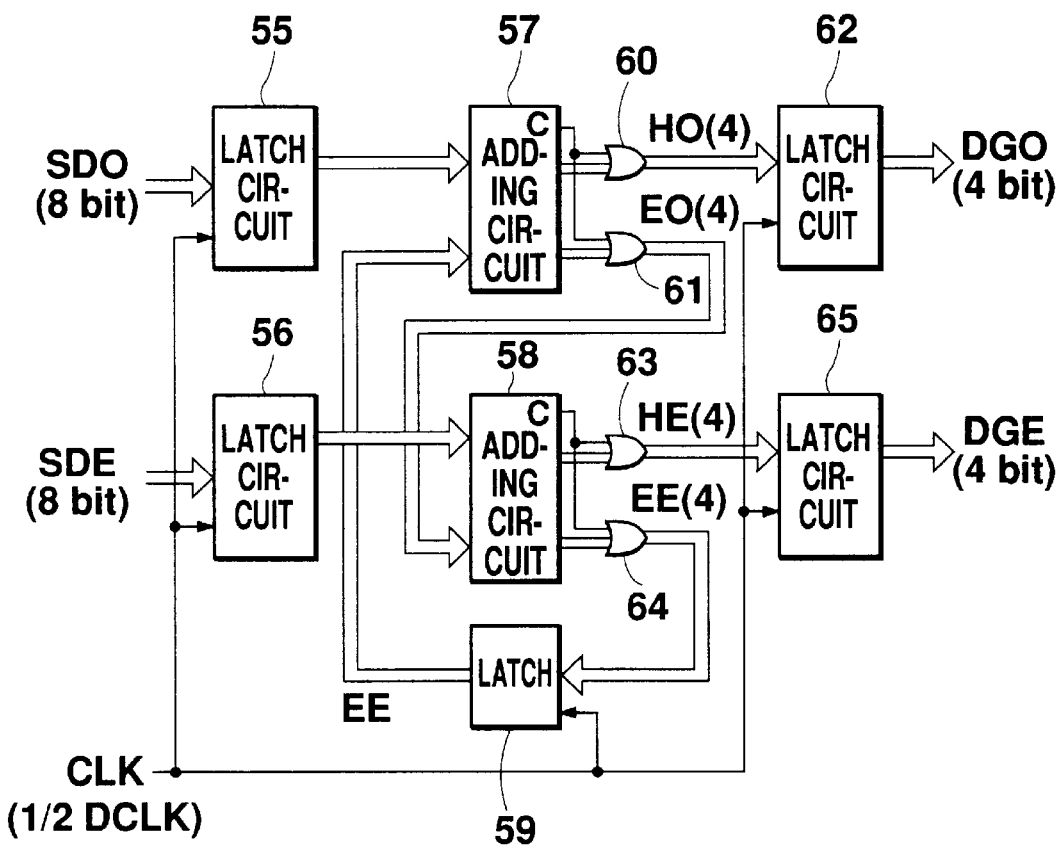
FIG. 7 is a block diagram showing the structure of an image information process apparatus of a first embodiment of the present invention.

FIG. 7 is a block diagram showing a first embodiment of the present invention. In the drawing, latch circuits 55 and 56 are each eight bit latch circuits for holding image data for two adjacent pixels using a clock CLK. Latch circuit 55 receives image data SDO for odd columns in the horizontal scanning direction, while latch circuit 56 receives image data SDE for even columns. In general, image data are serially supplied in synchronism with dot clocks. In this embodiment, however, odd column image data and even column image data are concurrently supplied to latch circuits 55 and 56, respectively, after being subjected to a serial-parallel conversion. Two eight bit parallel shift registers are used for serial-parallel conversion. These shift registers are shift-controlled via dot clocks. When two dot clocks are supplied, an output from the first register and that from the second register are respectively supplied to latch circuits 55 and 56 to be latched therein, whereby serial-parallel conversion is achieved. As described above, the operation of the circuit shown in FIG. 7 is controlled via clocks CLK each having a frequency of half that of a dot clock.

Latch circuit 55 supplies an output to a first adding circuit 57 to be added to error data EE of an immediately preceding pixel which is held in latch circuit 59. Through this adding process, the image data for an odd column pixel supplied are subjected to error diffusion, whereby corrected image data is made. The upper four bits of the corrected image data are supplied to OR gate 60, while the lower four bits are supplied to OR gate 61. OR gates 60 and 61, which receive a carry-over signal C from adding circuit 57, fix their outputs at the maximum value, i.e. "11111111", when a carry-over occurs due to the above adding process. The upper four bits outputted from OR gate 60 are held in latch circuit 62 as image display data HO for an odd column pixel.

On the other hand, the lower four bits outputted from OR gate 61 are supplied as error data EO for an odd column pixel to a second adding circuit 58 to be added to the image data SDE for an even column pixel. That is, the image data SDE, held in latch circuit 56, is added to the error data EO of its immediately preceding pixel, i.e., an odd column pixel, in adding circuit 58. Through this adding process, the image data for an even column pixel supplied is subjected to error diffusion, whereby corrected image data is made. The upper four bits of the corrected image data are supplied to CR gate 63, while the lower four bits are supplied to OR gate 64. Similar to the above OR gates 60 and 61, OR gates 63 and 64 also receive carry-over signals from adding circuit 58 and fix their outputs at the maximum value upon generation of a carry-over. The upper four bits outputted from OR gate 63 are further supplied into latch circuit 65 and held therein as image display data HE. The lower four bits outputted from OR gate 64, on the other hand, are supplied into latch circuit 59 and held therein as error data EE for an even column pixel. This error data EE is to be added to the image data for the next odd column pixel supplied to latch circuit 55, that is, a pixel immediately after the even column pixel which has just been processed.

The image display data DGO and DGE respectively held in latch circuits 62 and 65 are subjected to parallel-serial and supplied to a liquid crystal display in synchronism with dot clocks.

According to the embodiment shown in FIG. 7, image data for even column pixels and odd column pixels which were supplied in synchronism with dot clocks can be subjected to error diffusion in parallel. Thus, the clock frequency for error diffusion can be set at a half a dot clock frequency, which contributes to improvement of process performance. As a result, there can be provided an image process apparatus applicable to a display including a large number of pixels.

Embodiment 2.

Figure 8:
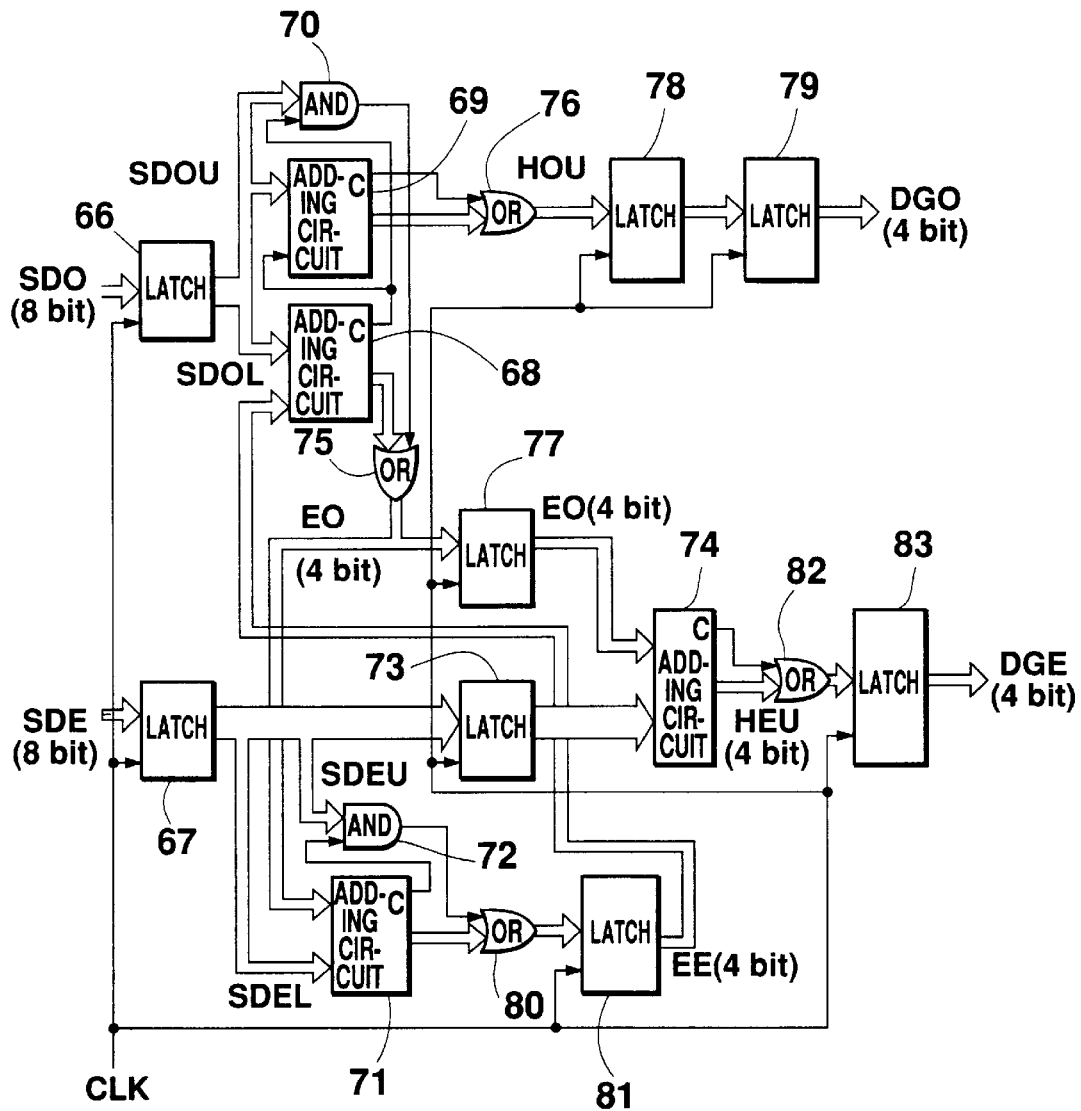
FIG. 8 is a block diagram showing the structure of an image information process apparatus of a second embodiment of the present invention.

FIG. 8 is a block diagram showing a second embodiment of the present invention, which is the same as the image process apparatus shown in FIG. 7 with an improved process speed. In FIG. 7, adding circuits 57 and 58 are serially connected to each other in terms of operations. That is, a carry-over due to adding the lower four bits the odd image data SDO and the four bit error data is informed to the upper bits; a carry-over signal C is confirmed; an added output is confirmed; adding circuit 58 performs an adding process; a carry-over signal C and an added output from adding circuit 58 are confirmed; and the ultimate output from this circuit is obtained. This is equivalent to a 16 bit adding circuit, whose processing period is a combination of a period of time until confirmation of an output of adding circuit 57 and that of adding circuit 58. Although a frequency of the clock CLK can be set at half of a frequency of the dot clock DCLK in this circuit, in actual fact, the processing period cannot be set short. For improvement in this respect, the embodiment shown in FIG. 8 has a structure in which error data and image display data are calculated by separate circuits.

In FIG. 8, image data SDO for an odd column pixel is supplied to latch circuit 66 and held therein, while image data SDE for an even column pixel is supplied to latch circuit 67 and held therein. The lower four bits SDOL of the image data SDO held in latch circuit 66 are supplied to a first adding circuit 68. The upper four bits SDOU thereof is supplied to a second adding circuit 69 and AND gate 70. On the other hand, the lower four bits SDEL of the image data SDE held in latch circuit 67 are inputted to a third adding circuit 71, while the upper four bit SDEU thereof are inputted to AND gate 72. The image data SDE is also supplied to latch circuit 73 and further to a fourth adding circuit 74 upon a clock delayed by one cycle.

Adding circuit 68 is a four bit adding circuit for calculating error data EO for odd column pixels, whose outputs are supplied to OR gate 75. It also supplies a carry-over signal C to a carry-over input of adding circuit 69 and to AND gate 70. Thus, AND gate 70 can obtain a carry-over signal before a carry-over signal C from adding circuit 68 becomes available, so that an output of OR gate 75 is fixed at the maximum value using an output of AND gate 70. To be more specific, because it takes time for AND gate 70 to obtain a carry-over signal through such a procedure that a carry-over signal C is supplied from adding circuit 68 to adding circuit 69 and a carry-over signal C therefrom is further supplied to AND gate 70, AND gate 70 instead obtains a carry-over signal based on a logical AND of a carry-over signal C from adding circuit 68 and the upper four bits of image data SDOU. Therefore, OR gate 75 can obtain error data EO of odd column pixel in a period of time necessary for adding four bits. Error data EO, outputted from OR gate 75, is supplied to adding circuit 71 to be added to the lower four bits SDEL for image data SDE for an even column pixel. Error data EO is also supplied to latch circuit 77, to be added to the image data SDE for an even column pixel upon the next clock CLK.

Adding circuit 69 adds a carry-over signal C from adding circuit 68 and the upper four bits of the image data SDOU to thereby obtain corrected image data. It supplies an added result and a carry-over signal C to OR gate 76 so that an output of OR gate 76 is fixed at the maximum value, when a carry-over occurred. With this arrangement, OR gate 76 can obtain image data HO in a period of time equivalent to combination of a period of time necessary to complete an adding process in adding circuit 68 and that in adding circuit 69, namely, eight bits. After being outputted from OR gate 76, the corrected image data HO is sequentially supplied to latch circuits 78 and 79 and further outputted as image display data DGO.

Adding circuit 71 adds the lower four bit image data SDEL of an even column pixel and error data EO for an odd column pixel to thereby obtain error data EE to be added to the next odd column pixel. Similar to the above, adding circuit 71 also supplies a carry-over signal C to AND gate 72 for the purpose of eliminating a delay due to transmission of a carry-over signal.

AND gate 72 then issues a carry-over signal, without an adding process, based on a logical AND of the carry-over signal C supplied and the upper four bits of image data SDEU. Adding circuit 71 and AND gate 72 respectively supply their outputs into OR gate 80, so that an output of OR gate 80 is fixed at a maximum value necessary when a carry-over occurred. With this arrangement, OR gate 80 can obtain image data EE in a period of time equivalent to combination of a period of time necessary to complete an adding process in adding circuit 68 and that in adding circuit 71, namely, eight bits. After being outputted from OR gate 80, the error data ED is held in latch circuit 81, and added to image data for an odd column pixel which is to be supplied upon the next clock CLK.

Aforementioned adding circuit 68, AND gate 70, OR gate 75, adding circuit 71, AND gate 72 and OR gate 80 together constitute an error data preparation circuit for making error data EO of odd column pixels and error data EE of even column pixels.

The adding circuit 74 receives error data EO delayed by one clock from latch circuit 77 and image data SDE for an even column pixel delayed by one clock from latch circuit 73, and adds them to make corrected image data for an even column pixel. The upper four bits of the added output are supplied to OR gate 82 as corrected image data together with a carry-over signal C. Here, the lower four bits are discarded as they have already been calculated by adding circuit 71 upon a clock CLK one cyde prior. OR gate 82 outputs corrected image data HEU into latch circuit 83, which further outputs data HEU as image display data DGE.

The image display data DGO for odd column pixels held in latch circuit 79 and the image display data DGE for even column pixels held in latch circuit 83 are both subjected to parallel-serial conversion before being serially supplied to a liquid crystal display in synchronism with a dot clock.

Figure 9:
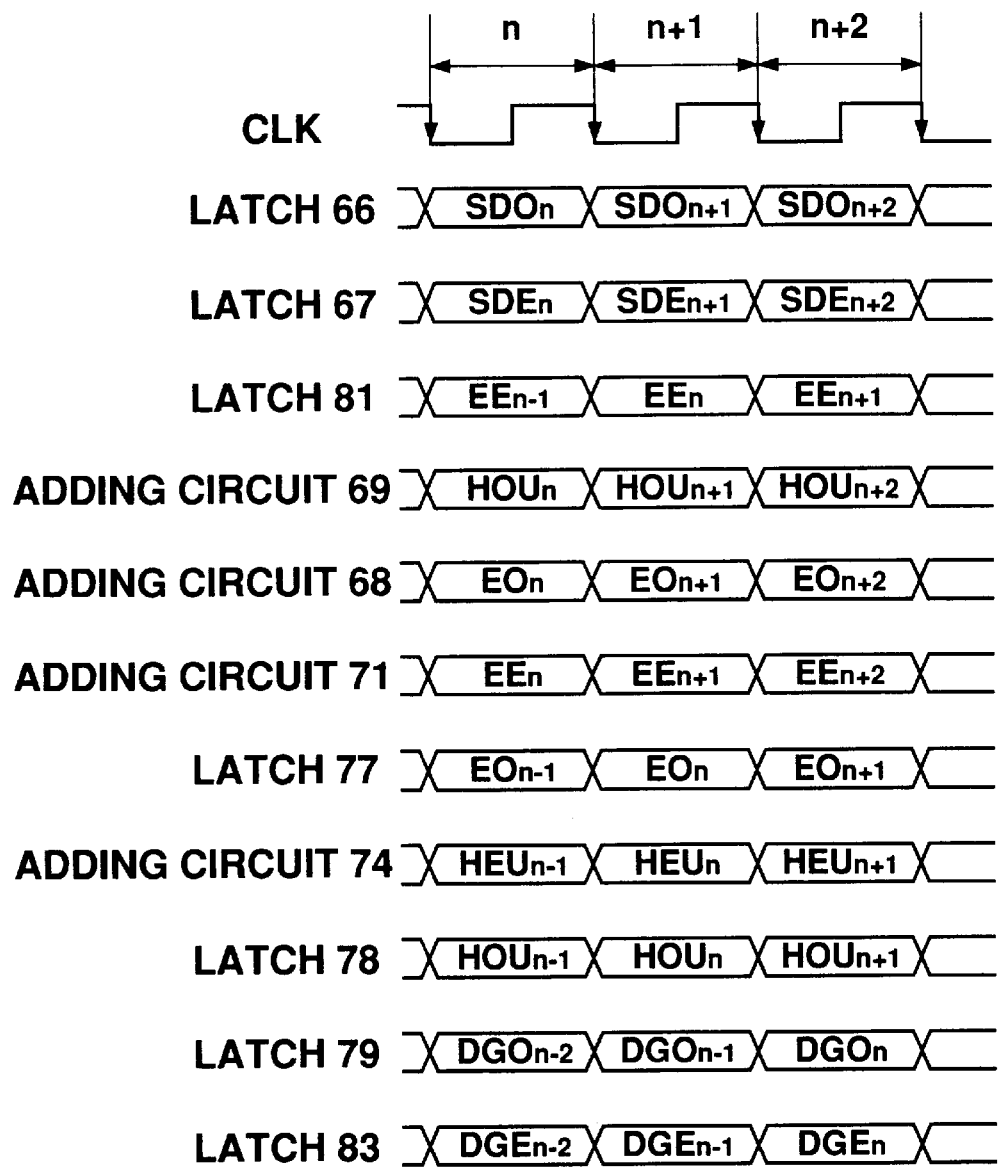
FIG. 9 shows the operation of the apparatus shown in FIG. 8.

Next, the operation timing for the embodiment shown in FIG. 8 will be described with reference to FIG. 9. FIG. 9 is a timing chart, in which respective latch circuits are initiated upon the fall of clocks CLK.

In the n-th cycle of a clock CLK, upon the fall of a clock, the image data SDOn for the n-th even column pixel and the image data SDEn for the n-th odd column pixel are respectively supplied to latch circuits 66 and 67 and held therein. By this time, latch circuit 81 has already held the error data EEn−1 for the (n−1)th even column pixel which was calculated in the previous clock cycle. Thus, in the n-th clock CLK period, adding circuit 68 adds the image data SDOLn supplied from latch circuit 66 and the error data EEn−1 supplied from latch circuit 81 to thereby obtain error data EOn. Further, adding circuit 69 calculates corrected image data HOUn. In addition, adding circuit 71 adds the error data EOn supplied from adding circuit 68 and the image data SDELn supplied from latch circuit 67 to thereby obtain error data EEn. In short, in the n-th clock CLK period, error data for the image data of the n-th even column pixel, that for the n-th odd column pixel and corrected image data for an add column are made.

In the following (n+1)th clock CLK cycle, error data EOn, error data EEn, corrected image data HOUn for an odd column pixel, and image data SDEn for an even column pixel are respectively supplied to latch circuit 77, latch circuit 81, latch circuit 78, and latch circuit 73 to be held therein. Latch circuits 66 and 67 are supplied with image data SDOn+1 for the next odd column pixel and image data SDEn+1 for the next even column pixel, respectively, so that error data will be calculated using them, similar to the n-th clock CLK cycle. In adding circuit 74, error data EOn from latch circuit 77 and image data SDEn from latch circuit 73 are added, whereby corrected image data HEUn for an even column pixel is obtained.

In the (n+2)th clock CLK cycle, the corrected image data HOUn for an odd column pixel is supplied from latch circuit 78 into latch circuit 79 and further outputted as image display data DGOn. The corrected image data HEUn for an even column pixel calculated by adding circuit 74 is supplied to latch circuit 83 and further outputted as image display data DGEn.

As described above, according to the image process circuit shown in FIG. 8, the image data SDO for an odd column pixel and the image data SDE for an even column pixel are concurrently supplied and processed over two clock cycles. In particular, error data EO for an odd column pixel, error data EE for an even column pixel, and image display data DGO for an odd column pixel are calculated at an earlier stage, followed by calculation of image display data DGE for an odd column pixel at a later stage. With this arrangement, at most an eight bit adding process is carried out in a single clock period, compared to an effective 16 bit process in the circuit shown in FIG. 7, which enables faster processing than the latter.

Embodiment 3.

Figure 10:
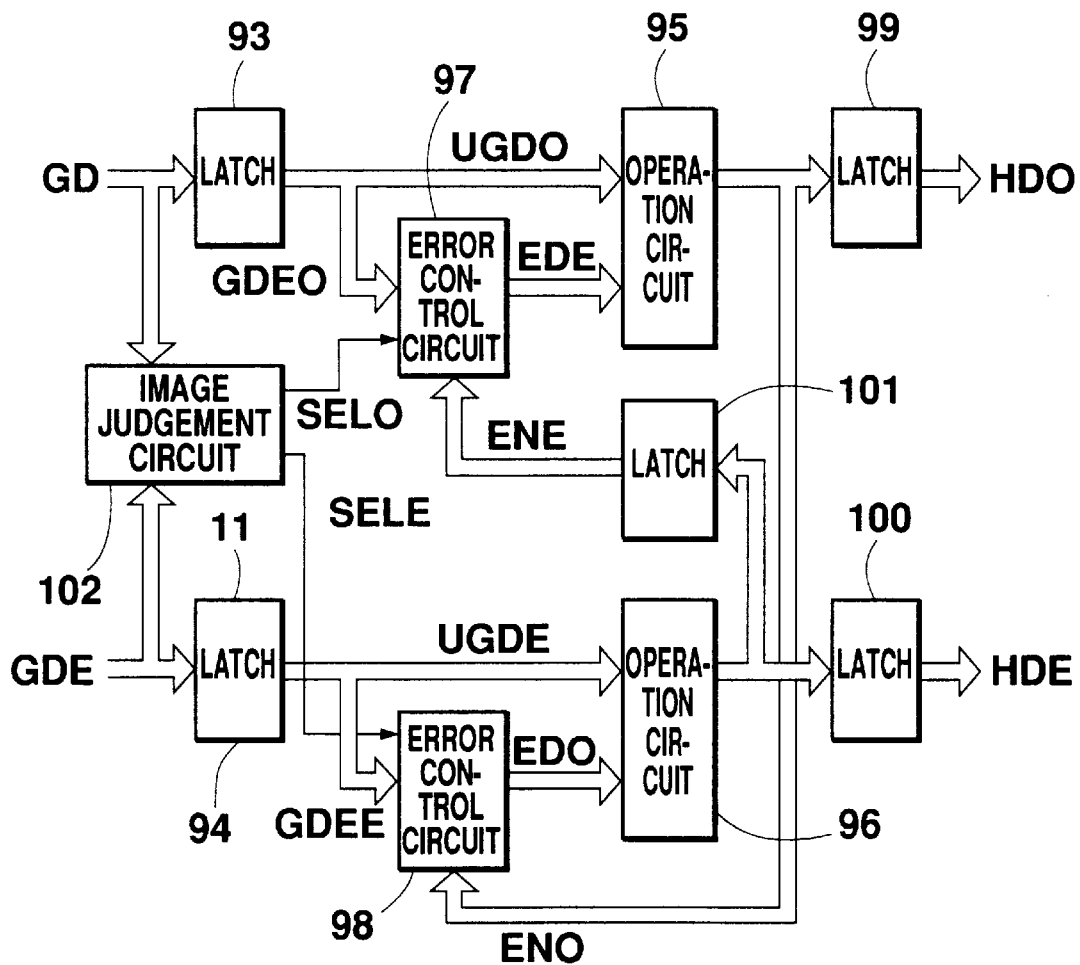
FIG. 10 is a block diagram showing the structure of an image information process apparatus of a third embodiment of the present invention.

FIG. 10 is a block diagram showing a third embodiment of the present invention. In the diagram, latch circuits 93 and 94 are each an eight bit latch circuit for receiving image data for two adjacent pixels according to a clock signal CLK and holding them. In particular, latch circuit 93 receives image data GDO for an odd column pixel in the horizontal scanning direction, while latch circuit 94 receives image data GDE for an even column pixel. Similar to Embodiments 1 and 2, those image data are concurrently supplied to respective latch circuits 93 and 94. The operations of the respective circuits in FIG. 10 are controlled via a clock signal CLK which has a frequency half that of a dot clock.

Latch circuits 93 and 94 respectively output image data UGDO and UGDE to operation circuits 95 and 96. They also output the lower four bits of their outputs to error control circuits 97 and 96, respectively, as error data GEDO and GEDD. In operation circuits 95 and 96, the image data for the lower four bits which could not be displayed with the immediately preceding pixel, that is, error data, is added to the image data UGDO and UGDE, respectively. For this, operation circuits 95 and 96 add error data EDE and EDO outputted respectively from error control circuits 97 and 98 to supplied image data UDGO and GDE UGDE. Operation circuits 95 and 96 also fix their output at the maximum value which can be expressed with eight bits, namely "11111111," when a carry-over has occurred as the result of the above adding process. The upper four bits of the outputs of the operation circuits 95 and 96 are supplied as display data HDO and HDE to latch circuits 99 and 100, respectively, while the lower four bits thereof are outputted as error data ENO and ENE to be used for the following pixel. The error data ENE, in particular, is held in latch circuit 101 until it is added to the image data for an odd column pixel to be next supplied to latch circuit 93 CLK, i.e., a pixel immediately after the even column pixel which has just been processed.

Image judgement circuit 102 holds a predetermined number of supplied image data GDO and GDE and judges continuity or discontinuity between them to thereby identify an image boundary. Circuit 102 applies a judgement output SELE to error control circuit 98 if an image boundary is found between the image data supplied to latch circuit 93 and 94, and a judgement output SELO to error control circuit 97 if one is found between the image data supplied to latch circuit 93 and that of the previous pixel.

In FIG. 10, latch circuit 93, operation circuit 95, error control circuit 97, and latch circuit 99 together constitute an odd column image process circuit, while latch circuit 94, operation circuit 96, error control circuit 98, and latch circuit 100 together constitute an even column image process circuit.

Figure 1:
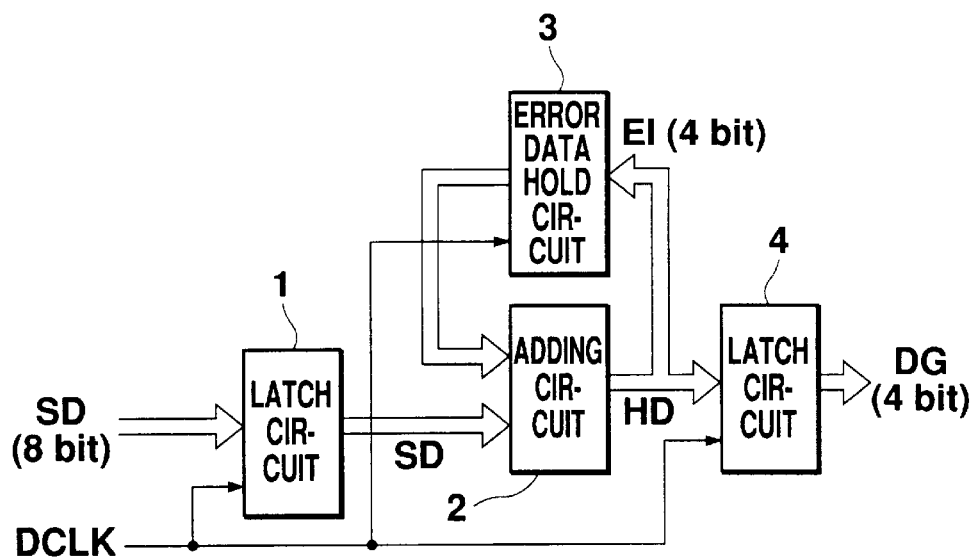
FIG. 1 is a block diagram showing the structure of a conventional image information process apparatus.
Figure 2:
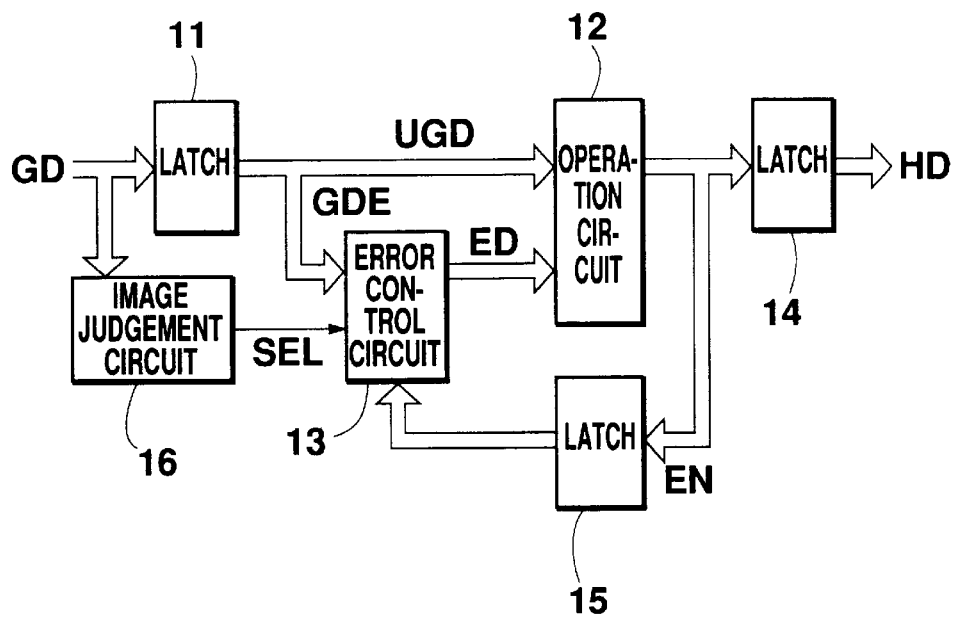
FIG. 2 is a block diagram showing another structure of a conventional image information process apparatus.

Error control circuits 97 and 98 in FIG. 10 have the same function as that of error control circuit 23 in FIG. 2. That is, they are responsible for the following operations: receiving error data ENE and ENO and outputting them into operation circuits 95 and 96, respectively, so that they will carry out general error diffusion processing; resetting error data ENE and ENO at a different pixel position for every horizontal scanning line; and preparing error data to be added using error data GDEO and GEDD of the lower four bits of image data GDO and GDE for a pixel after an image boundary, based on the assumption that the image data GDO and GDE is maintained to the image data for a pixel before the image boundary and outputting the error data to be added into operation circuits 95 and 96, respectively.

Figure 3:
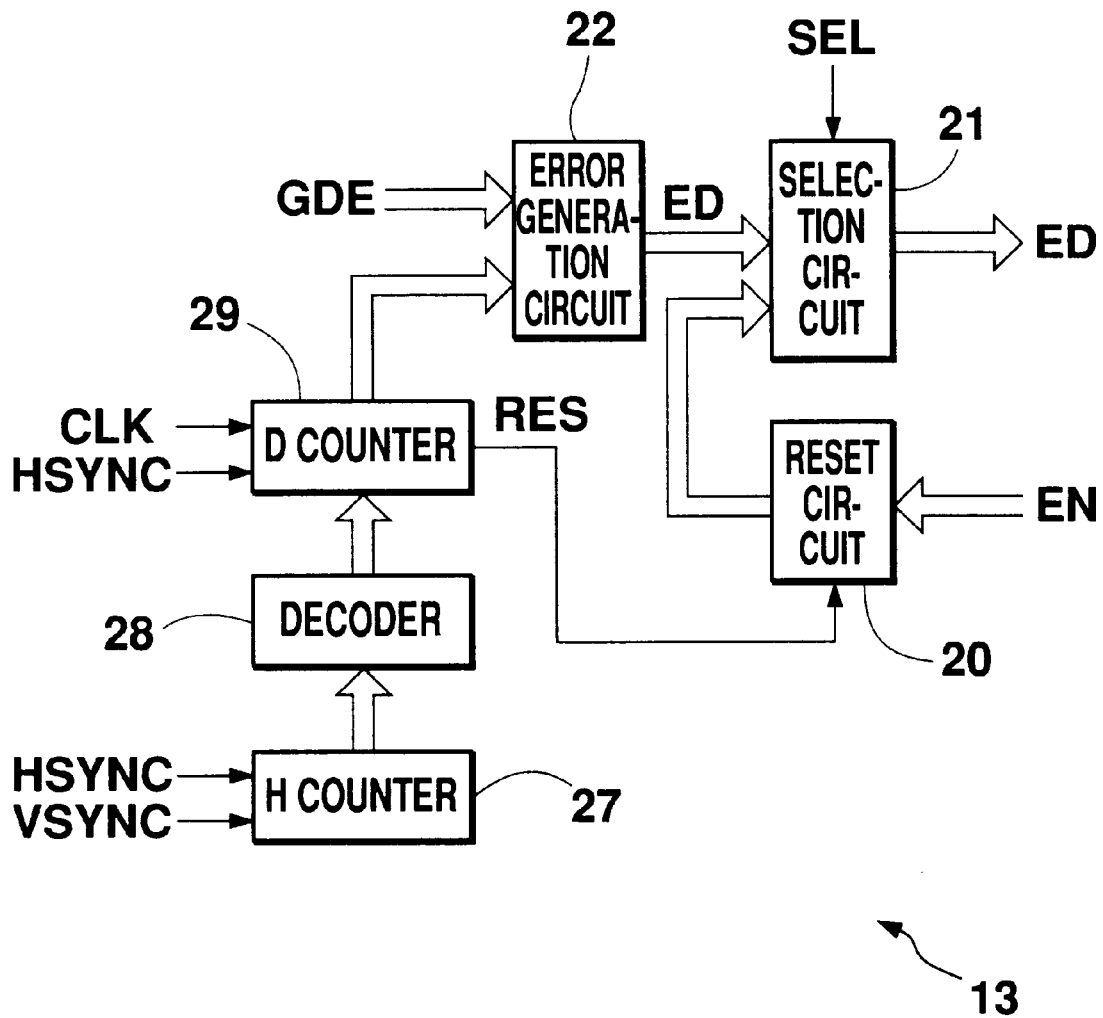
FIG. 3 is a block diagram showing the structure of error control circuit 13 shown in FIG. 2.

The structures of error control circuits 97 and 98 are almost the same as that shown in FIG. 3 except that the structures of a decoder and a dot counter are different between ones for odd columns and for even columns. In the following, an error control circuit will be described with reference to FIG. 11.

Figure 11:
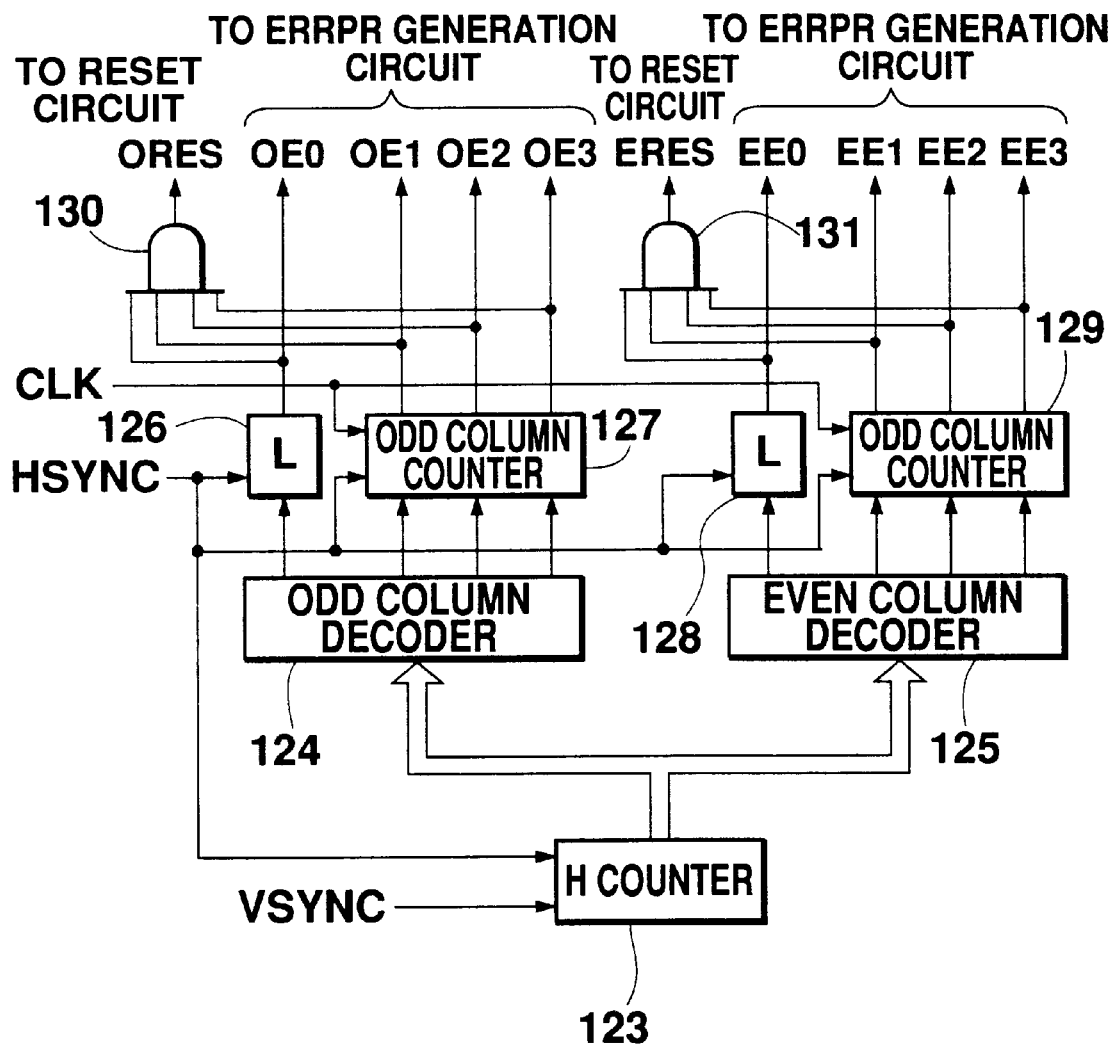
FIG. 11 is a block diagram showing the structure of an error control circuit shown in FIG. 10.

In FIG. 11, horizontal counter 123 is a four bit binary counter to be reset via a vertical synchronous signal VSYNC. This counter 123 counts horizontal synchronous signals HSYNC and identifies the position of a horizontal scanning line of image data supplied. This counter 123 is commonly used by odd and even column image process circuits, so that outputs thereof are supplied to odd column decoder 124 in an error control circuit for an odd column image process circuit as well as to even column decoder 125 in an error control circuit for an even column image process circuit.

Odd column decoder 124 and even column decoder 125 are each a reset position circuit for specifying the position of a pixel where error data is reset. They output data of a four bit value according to the counter value of horizontal counter 123 so that reset timings for error data ENO and ENE will be periodically changed. A latch circuit 126 and an odd column counter 127 constitute an odd column dot counter. The former receives the lowest bit of an output of odd column decoder 124, while the latter receives the upper three bits thereof. On the other hand, a latch circuit 128 and an even column counter 129 together constitute an even column dot counter. The former receives the lowest bit of an output of even column decoder 125, while the latter receives the upper three bits thereof. Presetting of latch circuit 126, odd column counter 127, latch circuit 128, and even column counter 129 is controlled via a horizontal synchronous signal HSYNC. Odd column counter 127 and even column counter 129 count clock signals CLK and increment their preset counter values accordingly. In this event, since image data GDO and GDE are concurrently supplied in synchronism with a clock signal CLK, the positions of pixels in odd and even columns progress by two. Thus, the value expressed with the upper three bits supplied to odd and even column counter 127 and 129 are incremented upon clock signals, while that of the lowest bit is kept fixed. The value of data outputted from even column decoder 125 is larger by one than that from odd column decoder 124.

Outputs of latch circuit 126 and odd column counter 127, namely OE0, OE1, OE2, and OE3, are supplied as data indicating positions of odd column pixels into an error generation circuit such as is shown in FIG. 3, as well as into AND gate 130. Similarly, outputs of latch counter 128 and even column counter 129, namely EE0, EE1, EE2, and EE3, are supplied as data indicating positions of even column pixel into an error generation circuit, as; well as into AND gate 131. AND gates 130 and 131 detect the position of a pixel where error data is to be reset and output reset signals ORES and ERES into a reset circuit such as is shown in FIG. 3 when the data indicating a pixel position becomes "1111."

The operation of the structure shown in FIG. 11 will next be described with reference to FIG. 12. FIG. 12 shows preset data with respect to respective horizontal scanning lines, which are outputted from odd column decoder 124 and even column decoder 125 in order to create the same reset pattern as shown in FIG. 4A.

As an example, if the horizontal counter 123 value is "1," odd column decoder 124 outputs data "13," and even column decoder 125 outputs data "14." Assume that a clock signal CLK is applied after the above values "13" and "14" are preset to latch circuit 126 and odd column counter 127, and to latch circuit 128 and even column counter 129, respectively. With two counts advanced, an output value from latch circuit 126 and odd column counter 127 becomes "15," so that AND gate 130 outputs a reset signal ORES. As a result, error data ENE is reset in the odd column image process circuit. In this event, an output value from latch circuit 128 and even column counter 129 is "0." Thereafter, respective output values advance by two for every input of a clock CLK signal. If there is an image boundary between pixel "7" and "8" in the horizontal scanning line "1," image judgement circuit 102 outputs a judgement output SELE at the pixel "8." Upon this, error control circuit 98 in even column image process circuit calculates error data by adding one to the distance from the reset position which is indicated by the outputs of latch circuit 128 and even column counter 129, namely six in this case, and further by multiplying the added result by error data GDEE. Error control circuit 98 then supplies the error data calculated to operation circuit 965. With the above procedure, display data HDE which is made based on the assumption that image data GDE is maintained as that of a previous pixel is obtained as an output of the even column image process circuit.

In cases of a horizontal counter 123 value "2," that is, where the horizontal scanning line "2" is the line in question, odd column decoder 24 outputs data "10," while even column decoder 25 outputs data "11." These values are preset to latch circuit 126 and odd column counter 127, and to latch circuit 128 and even column counter 129, respectively, upon a horizontal synchronous signal HSYNC. Assume that two clock signals CLK are applied after the above preset, latch circuit 126 and odd column counter 127 output data "14," while latch circuit 128 and even column counter 129 output data "15." Accordingly, AND gate 131 output a reset signal ERES, so that error data ENO is reset in the odd column image process circuit.

As described above, with an arrangement wherein the lowest bit of the outputs of odd column decoder 124 and even column decoder 125 are held in latch circuits 126 and 128, respectively, the position of a pixel where error data is to be reset can be correctly located whether it is an odd pixel or an even pixel. Further, since a distance from a reset pixel to the processing pixel position can be known separately with respect to image data for odd and even column pixel supplied, an odd column image process circuit and an even column image process circuit can independently make error data for their own use.

Although one reset pattern is generated in the structure shown in FIG. 11, a plurality of reset patterns may be generated depending on error data GDEO and GDEE. In such cases, the same number of odd column decoders 124, latch circuits 126, odd column counters 127, even column decoders 125, latch circuits 128, and even column counter 129 as the number of the reset patterns to be generated are provided so that outputs of suitable devices among them may be selected according to error data GDEO and GDEE. Embodiment 4.

Figure 13:
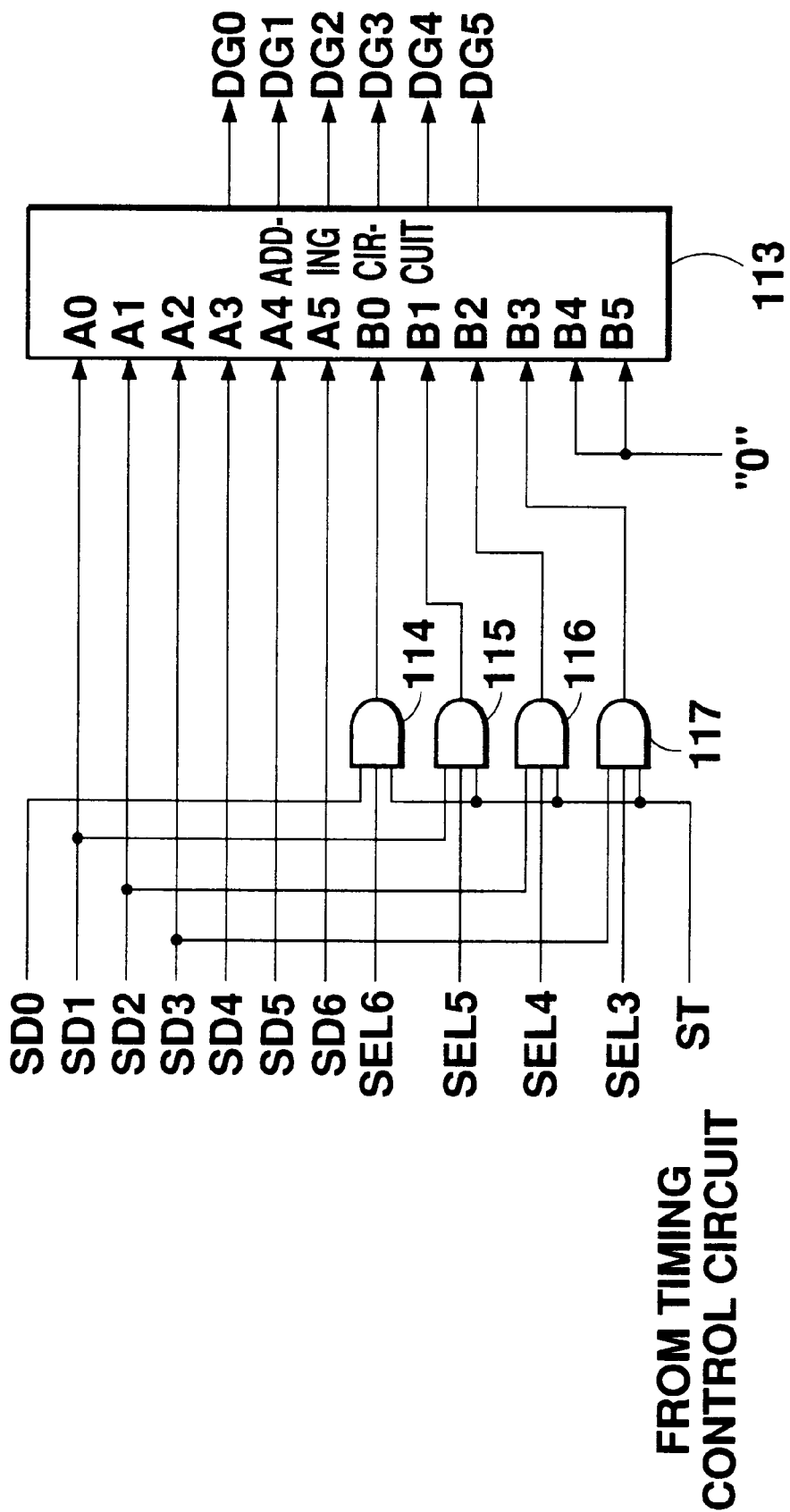
FIG. 13 is a block diagram showing the structure of an image information process apparatus of a fourth embodiment of the present invention.

FIG. 13 is a block diagram showing a fourth embodiment of the present invention. This is an image information process apparatus which is capable of handling a 7-6 mode for converting seven bit image data into six bit display data, a 6-5 mode for converting six bit image data into five bit display data, a 5-4 mode for converting five bit image data into four bit display data, and a 4-3 mode for converting four bit image data into three bit display data.

In FIG. 13, adding circuit 113 has a group of adding inputs consisting of adding inputs A0–5 for six bit input, another group of adding inputs consisting of adding inputs B0–5 for six bit input, and one group of adding outputs consisting of adding outputs DG0–5 for six bit output. This image information process apparatus has inputs SD0–6 for seven bit input via which image data are inputted. Image data inputted via the upper six bits SD1–6 are supplied to adding circuit 113 via one group of adding inputs, namely adding inputs A0–5, and that via the lowest bit SD0 is supplied to AND gate 114. Image data inputted via SD1 is also supplied to AND gate 115; that via SD2 is supplied to AND gate 116; and that via SD3 is supplied to AND gate 117. AND gates 114, 115, 116, and 117 each also receive a timing signal ST for alternately switching between add processing and non-add processing, and further receive selection signals SEL6, SEL5, SEL4, and SEL3, respectively. Outputs of AND gates 114, 115, 116, and 117 are supplied to adding circuit 113 via another group of adding inputs, namely adding inputs B0, B1, B2, and B3. Via adding inputs B4 and E;5, data "0" are supplied.

In cases where a 7-6 mode is applied, a selection signal SEL6 is set at "1," while other selection signals SEL5, SEL4, and SEL3 are set at "0." With this situation, AND gate 114 becomes solely operative. When seven bit image data are inputted via image data inputs SD0–6, AND gate 114, which receives a timing control signal ST, outputs a signal for the image data inputted via the input SD0 to adding circuit 113 via the adding input B0 for every other frame. As a result, the least significant bit (SD0) of image data is added to its upper bit, and resultantly to the data of the upper six bits (SD1–6) the rest for every other frame. Added outputs DG0–5 of adding circuit 113 are used as display data.

For applying a 6-5 mode, a selection signal SEL5 is set at "1," while other selection signals SEL6, SEL4, and SEL3 are set at "0." With this situation, AND gate 115 is solely operative. When six bit image data are inputted via image data inputs SD16, AND gate 115, which receives a timing control signal ST, outputs a signal for the image data inputted via the input SD1 into the adding circuit 113 via the adding input B1 for every other frame. As a result, the lowest bit (SD1) of image data is added to its upper bit, and resultantly to the data for its upper five bits (SD2–6) thereby for every other frame. Added outputs DG1–5 of adding circuit 113 are used as display data.

For applying a 5-4 mode, a selection signal SEL4 is set at "1," while other selection signals SEL6, SEL5, and SEL3 are set at "0." With this situation, AND gate 116 is solely operative. When five bit image data are inputted via image data inputs SD2–6, AND gate 116, which receives a timing control signal ST, outputs a signal for the image data inputted via the input SD2 into adding circuit 113 via the adding input B2 for every other frame. As a result, the lowest bit (SD2) of image data is added to its upper bit, and resultantly to the data for its upper four bits (SD3–6) thereof for every other frame. Added outputs DG2–5 of adding circuit 113 are used as display data.

For applying a 4-3 mode, a selection signal SEL3 is set at "1," while other selection signals SEL6, SEL5, and SEL4 are set at "0." With this situation, AND gate 117 is solely operative. When four bit image data are inputted via image data inputs SD3–6, AND gate 117, which receives a timing control signal ST, outputs a signal for the image data inputted via the input SD3 into adding circuit 113 via the adding input B3 for every other frame. As a result, the lowest bit (SD3) of image data is added to its upper bit, and resultantly to the data for the upper three bits (SD4–6) thereof for every other frame. Added outputs DG3–5 of adding circuit 113 are used as display data.

As described above, with an arrangement in which AND gate 114, 115, 116 and 117 each receive a control signal ST and the lowest bit of image data in respective modes, and their operations are switched according to selection signals SEL6, SEL5, SEL4, and SEL3, the lowest bit position can be determined from among image data inputs SD0–6. This makes it possible for an image information process apparatus including a single adding circuit 113 to handle various modes with different numbers of input bits for image data.

Figure 5:
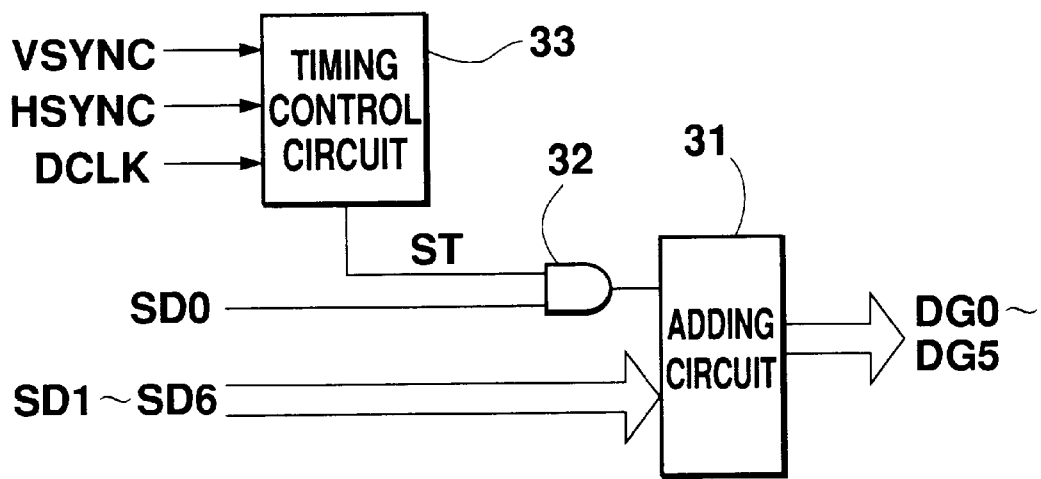
FIG. 5 is a block diagram showing still another structure of a conventional image information process apparatus.
Figure 6:
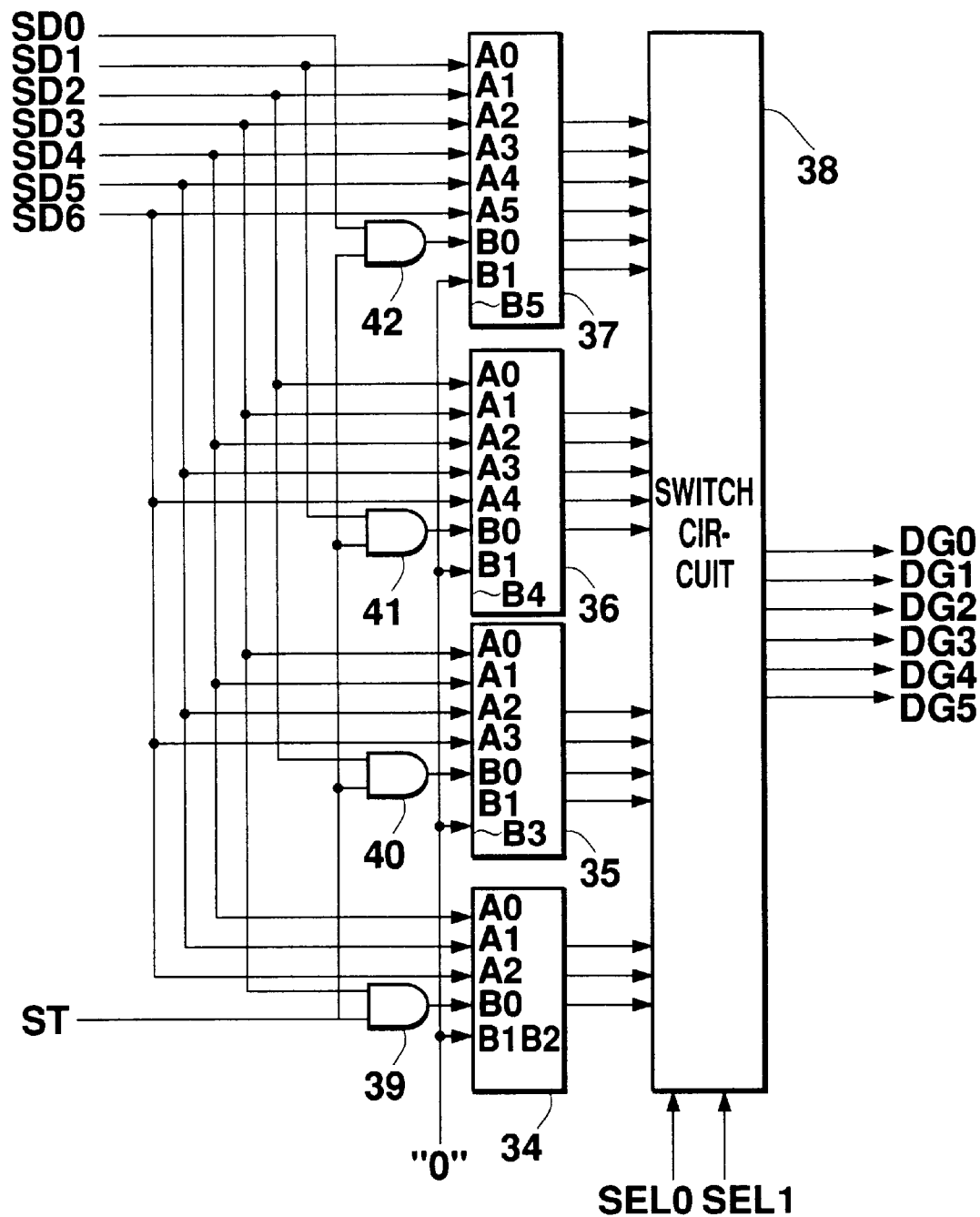
FIG. 6 is a block diagram showing an example of a concrete structure of the apparatus shown in FIG. 5.

In FIG. 13, a control signal ST is supplied from timing control circuit which is the same as that shown in FIG. 5. With this signal, adding processing is performed for every other dots for every other line, and, with respect to the same pixel, for every other frame.

What is claimed is:

1. An image information processing apparatus applied to a display for displaying images based on L bit image display data for each pixel, for causing the display to display continuous tones in an error diffusion manner based on P bit image data, P being larger than L, comprising:

a first adding circuit for adding error data and a predetermined lower bit of the image data for a front column pixel in image data for horizontally consecutive front and rear column pixels;

a second adding circuit for adding a carry-over signal from the first adding circuit and a predetermined upper bit of the image data for the front column pixel, and outputting an added result as the image display data for the front column pixel;

a third adding circuit for adding error data outputted from the first adding circuit and a predetermined lower bit of image data for the rear column pixel in the image data for horizontally consecutive front and rear column pixels, the image data for the rear column pixel being concurrently supplied with the image data for the front column pixel;

a first holding circuit for holding an output of the third adding circuit for a predetermined period of time, and outputting error data to the first adding circuit;

a second holding circuit for holding the error data outputted from the first adding circuit for a predetermined period of time; and a fourth adding circuit for adding the error data held in the second holding circuit and the image data for the rear column pixel, and outputting a predetermined upper bit of an added result as image display data for the rear column pixel.

2. An image information process circuit as defined in claim 1, further comprising a carry-over signal generation circuit for generating a carry-over signal having the same content as a carry-over signal outputted from the second adding circuit based on a logical AND of the carry-over signal outputted from the first adding circuit and a predetermined upper bit of the image data for the front column pixel, and outputting the carry-over signal generated prior to issuance the carry-over signal from the second adding circuit.

3. An image information process apparatus as defined in claim 2, further comprising a second carry-over signal generation circuit for generating a carry-over signal which is to be generated when the error data for the front column pixel is added to the image data for the rear column pixel, based on a logical AND of a carry-over signal from the third adding circuit and a predetermined upper bit of the image data for the rear column pixel.

4. An image information processing apparatus applied to a display for displaying images based on L bit image display data for each pixel, for causing the display to display continuous tones in a pseudo manner based on P bit image data of a P number of bits, P being larger than L, comprising:

a plurality of image data process circuits corresponding to a plurality of image data for horizontally consecutive front and rear column pixels, for concurrently receiving the plurality of image data; wherein each of the plurality of image data process circuits includes an error data output circuit for outputting a lower "P-L" bit/bits which is/are not displayed by the display as error data;

an operation circuit for adding the image data supplied and the error data outputted from one of the plurality of image data process circuits corresponding to a pixel at an immediately preceding column; and an error control circuit for periodically resetting the error data, making error data to be added to image data after a change of pixel data, based on error data of image data after the change of pixel data and an assumption that the image data after the change is maintained as image data before the change, and supplying the error data made to the operation circuit in place of error data outputted from the image data process circuit corresponding to a pixel at an immediately preceding column;

the plurality of image data process circuits each including an odd column image data process circuit and an even column image data process circuit for concurrently receiving image data for horizontally continuous odd and even column pixels, respectively;

the error control circuit including a horizontal counter for counting horizontal synchronous signals for periodically changing a reset pixel position where the error data is reset for every horizontal scanning line;

an odd column reset position setting circuit and an even column reset position setting circuit for respectively specifying the reset pixel positions in corresponding horizontal scanning lines, based on a counter value of the horizontal counter;

an odd column pixel counter for detecting a pixel position in an odd column according to a pixel reset position specified by the odd column reset position setting circuit; and an even column pixel counter for detecting a pixel position in an even column according to a pixel reset position specified by the odd column reset position setting circuit.

5. An image information processing apparatus applied to a display for displaying images based on L bit image display data for each pixel, for causing the display to display continuous tones in a pseudo manner based on P bit image data of a P number of bits, P being larger than L, comprising:

a plurality of image data process circuits corresponding to a plurality of image data for horizontally consecutive front and rear column pixels, for concurrently receiving the plurality of image data; wherein each of the plurality of image data process circuits includes an error data output circuit for outputting a lower "P-L" bit/bits which is/are not displayed by the display as error data;

an operation circuit for adding the image data supplied and the error data outputted from one of the plurality of image data process circuits corresponding to a pixel at an immediately preceding column; and an error control circuit for periodically resetting the error data, making error data to be added to image data after a change of pixel data, based on error data of image data after the change of pixel data and an assumption that the image data after the change is maintained as image data before the change, and supplying the error data made to the operation circuit in place of error data outputted from the image data process circuit corresponding to a pixel at an immediately preceding column;

the plurality of image data process circuits each including an odd column image data process circuit and an even column image data process circuit for concurrently receiving image data for horizontally continuous odd and even column pixels, respectively;

the error control circuit including a horizontal counter for counting horizontal synchronous signals for periodically changing a reset pixel position where the error data is reset for every horizontal scanning line;

an odd column reset position settling circuit and an even column reset position setting circuit for respectively specifying the reset pixel positions in corresponding horizontal scanning lines based on a counter value of the horizontal counter;

an odd column pixel counter for detecting a pixel position in an odd column according to a pixel reset position specified by the odd column reset position setting circuit; and an even column pixel counter for detecting a pixel position in an even column according to a pixel reset position specified by the odd column reset position setting circuit;

the odd column pixel counter and the even column pixel counter being preset with values indicating pixel preset positions specified by the odd column reset position setting circuit and the even column reset position setting circuit, respectively, such that a least significant bit of the values preset is fixed, and numbers are added to values of all bits except for the least significant bit of the values preset indicating pixel preset positions, according to a clock signal.

6. An image information process apparatus which selects alternately for every frame to add or not add a least significant bit of N+1 bit image data to an upper N bits of the N+1 bit image data so as to display in a pseudo manner a finer continuous tones than those which are able to be displayed with respective pixels, and outputs N bit image display data, comprising:

an adding circuit for receiving the N+1 bit image data via one group of adding inputs thereof; and a plurality of gate circuits each for receiving data for the least significant bit of the N+1 bit image data and supplying an output to the adding circuit via another group of adding inputs; wherein each of the plurality of gate circuits receives a timing signal for controlling a timing to add or not add a least significant bit of N+1 bit image data to upper N bits of the N+1 bit image data, as well as a selection signal for selecting one of the plurality of gate circuits according to a value of N which is desirably set.

7. An image information process apparatus as defined in claim 6, wherein the adding circuit receives the N+1 bit image data via adding inputs for from a most significant bit input to a least significant bit input which all belong to one group of adding inputs, a value of N+1 varying depending on the value of N which is desirably set, the least significant bit being determined depending on a minimum bit number which N+1 is allowed to take, and the adding circuit outputs N bit data out of an added result as image display data, the N bit data consisting of N bits beginning with a mossy significant bit.

8. An image information process apparatus as defined in claim 6, wherein the adding circuit includes such number of adding inputs that correspond to a maximum bit number which a value of N+1 takes, the value of N+1 being determined upon a value of N which is desirably set.

* * * * *